P. BUBANY.
NUT LOCK.
APPLICATION FILED JULY 26, 1911.
1,036,185.
Patented Aug. 20, 1912.
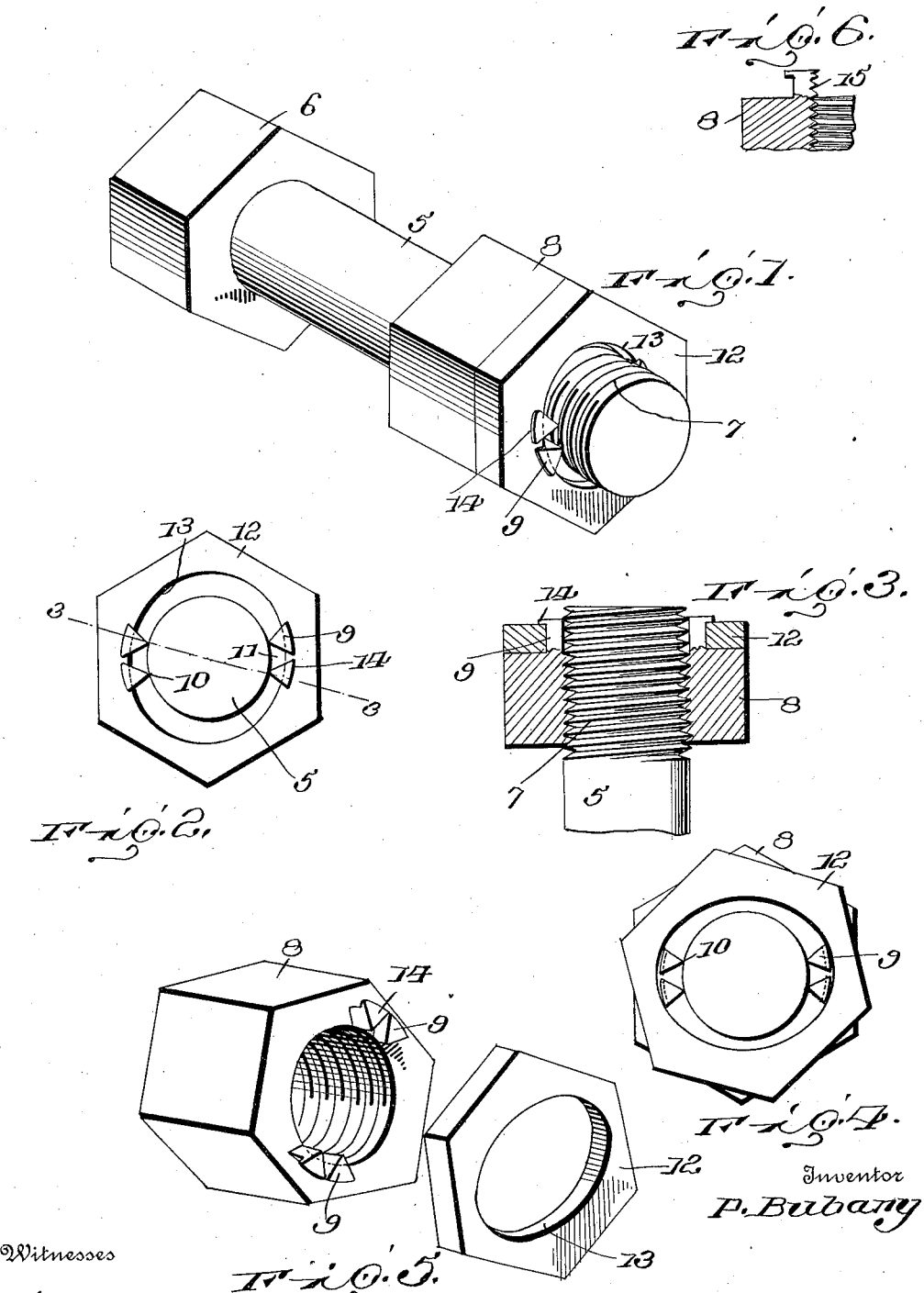

UNITED STATES PATENT OFFICE.

PHILIP BUBANY, OF ALBIA, IOWA.

NUT-LOCK.

1,036,185.

Specification of Letters Patent.   Patented Aug. 20, 1912.

Application filed July 26, 1911.   Serial No. 640,675.

*To all whom it may concern:*

Be it known that I, PHILIP BUBANY, citizen of the United States, residing at Albia, in the county of Monroe and State of Iowa, have invented certain new and useful Improvements in Nut-Locks, of which the following is a specification.

This invention relates to nut locks and has for its object the provision of a comparatively simple and thoroughly efficient device of this character, by means of which a nut may be securely held against accidental rotation on a threaded bolt or other support.

A further object is to provide a locking device including main and auxiliary nuts, one of which is provided with longitudinally disposed locking lugs adapted to bite into the threads on a bolt and thus prevent displacement of the main nut when the auxiliary nut is rotated.

A further object is to provide the locking lugs with terminal lips or flanges adapted to bear against the upper surface of the auxiliary nut and assist in preventing accidental displacement thereof.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a perspective view of a nut lock constructed in accordance with my invention; Fig. 2 is a front elevation of the same, showing the manner of locking the nut against rotation on the bolt; Fig. 3 is a vertical sectional view taken on the line 3—3 of Fig. 2; Fig. 4 is a front elevation, showing the auxiliary nut or washer rotated so as to release the main nut; Fig. 5 is a perspective view of the main and auxiliary nuts detached. Fig. 6 is a detail sectional view, showing a modified form of the invention.

Corresponding and like parts are referred to in the following description and indicated in all the views of the drawing by the same reference characters.

The improved locking device forming the subject matter of the present invention comprises a bolt 5 having one end thereof provided with an enlarged head 6 for engagement with a suitable support and its other end threaded at 7. Mounted for rotation on the threaded end of the bolt 5, is a correspondingly threaded nut 8, said nut being provided with a plurality of sets of longitudinally disposed locking lugs 9, each provided with a cutting edge 10 adapted to bite into the threads 7 and thus prevent accidental rotation of said nut. The lugs 9 of each set are preferably spaced apart to form substantially triangular recesses 11 so as to permit said lugs to be forced inwardly without wedging or binding action between the parts, the opposite faces of each lug being preferably inclined in the direction of the cutting edge 10, as shown.

Disposed in front of the main nut 8, is an auxiliary nut or washer 12, preferably of the same size and shape as said main nut and having an opening 13 formed therein substantially elliptical in shape for the reception of the locking lugs 9, there being laterally extending lips or flanges 14 formed on said lugs and adapted to bear against the outer face of the auxiliary nut 12 to assist in preventing accidental displacement thereof. By making the opening 13 in the auxiliary nut elliptical or oval in shape, when said auxiliary nut is rotated, the walls of the opening will be forced into engagement with the walls of the lugs 9, thereby to cause the cutting edges 10 of the lugs to bite into the threads on the bolt and effectually lock the main nut against accidental displacement.

In operation, the main nut 8 is adjusted longitudinally on the threaded end of the bolt to the desired position, after which the auxiliary nut 12 is placed over the threaded end of the bolt with the locking lips 14 bearing against the outer or exposed face thereof, the auxiliary nut being subsequently rotated so as to compress the locking lugs and force the cutting edges thereof into engagement with the threads on the bolt, as before stated. In order to release the main nut, it is merely necessary to rotate the auxiliary nut in the reverse direction which disengages the walls of the slot 13 from the lugs 9, thus permitting the latter to expand and the main nut to be readily removed from the bolt.

In Fig. 6 of the drawing, there is illustrated a modified form of the invention, in which the inner faces of the lugs, instead of being provided with cutting edges, are formed with threads 15 for engagement with the threaded end of the bolt.

It will of course be understood that the main nut may be provided with any desired number of locking lugs and in some cases, the locking lips or flanges 14 may be dispensed with, without departing from the spirit of the invention.

Having thus described the invention, what is claimed as new is:

1. The combination with a threaded bolt, of a nut mounted for rotation on the bolt and provided with locking lugs having cutting edges, and an auxiliary nut having an opening substantially elliptical in shape formed therein, the walls of said opening being adapted to engage the locking lugs to force the cutting edges thereof into engagement with the threads on the bolt when said auxiliary nut is rotated.

2. The combination with a threaded bolt, of a nut mounted for rotation thereon and provided with oppositely disposed sets of locking lugs having their inner faces provided with cutting edges and their free ends extended laterally to form lips, and an auxiliary nut having an opening substantially elliptical in shape for the reception of the lugs and having its outer face bearing against said lips, the walls of said opening being adapted to bear against the locking lugs and force the cutting edges thereof into engagement with the threads on the bolt when the auxiliary nut is rotated in one direction and to release said cutting edges when the auxiliary nut is rotated in another direction.

3. The combination with a threaded bolt, of a nut mounted for rotation thereon and provided with locking lugs, and an auxiliary nut having an opening substantially elliptical in shape formed therein, the walls of said opening being adapted to bear against the locking lugs and force the latter into engagement with the threads on the bolt when the auxiliary nut is rotated in one direction and to permit the release of the locking lugs when the auxiliary nut is rotated in another direction.

In testimony whereof, I affix my signature in presence of two witnesses.

PHILIP BUBANY. [L. S.]

Witnesses:
D. W. BATES,
EMMA PORTER.

Copies of this patent may be obtained for five cents each, by addressing the "Commissioner of Patents, Washington, D. C."